Oct. 28, 1969  W. GAUER ET AL  3,474,653
METAL STRIP EDGING APPARATUS
Filed Aug. 23, 1967  5 Sheets-Sheet 1
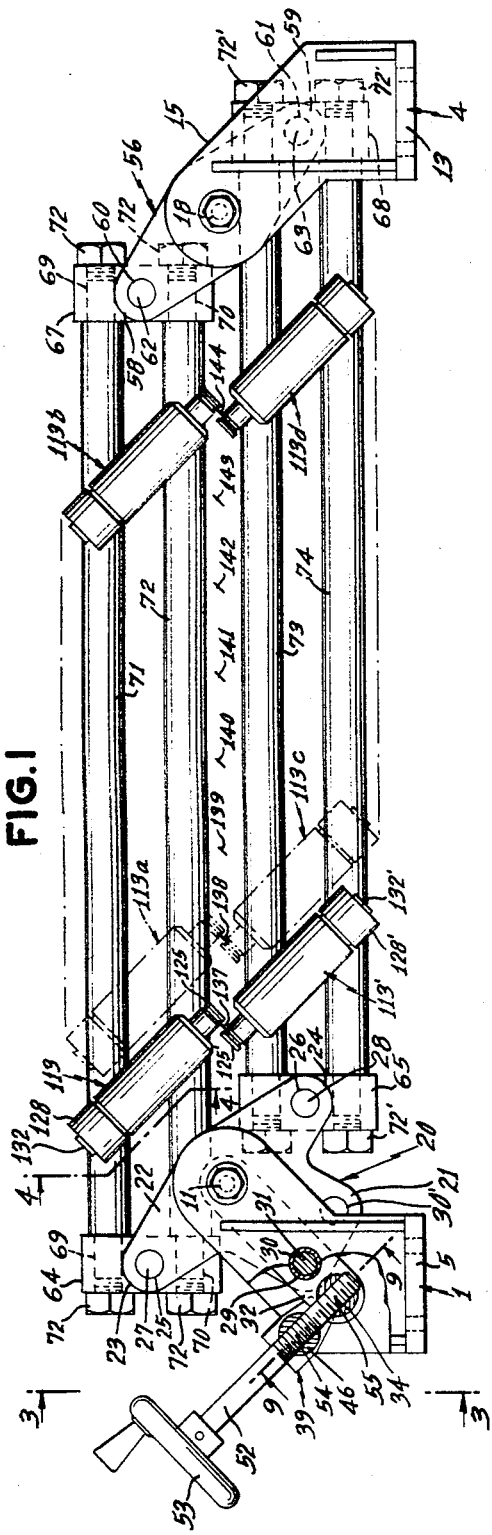
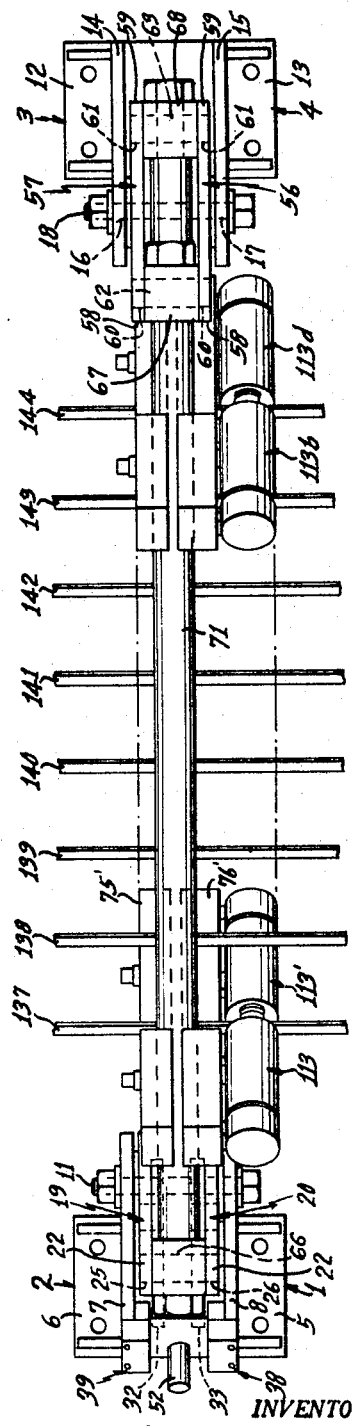
INVENTORS
Walter Gauer
Richard E. Hathaway
AGENT

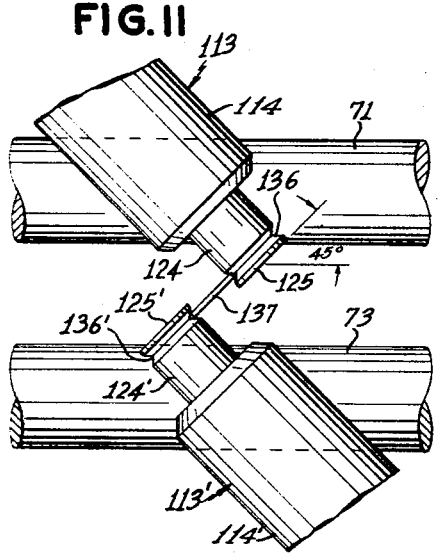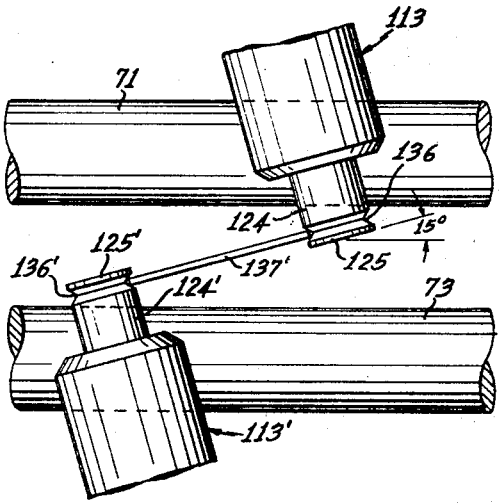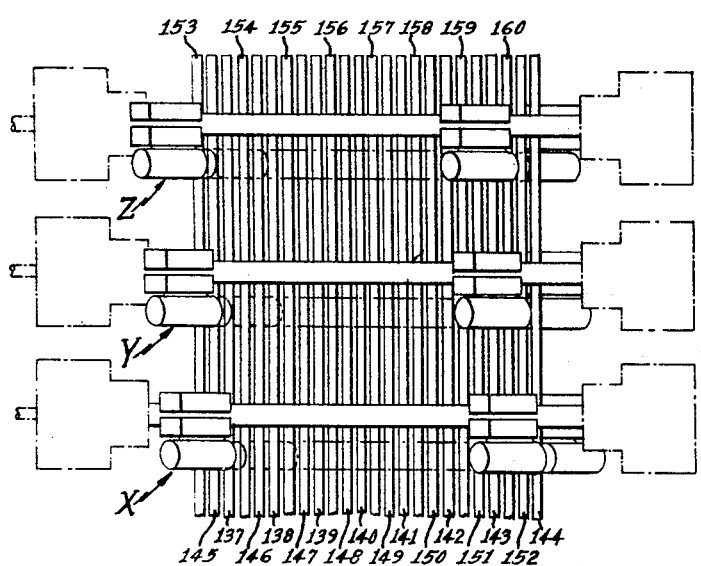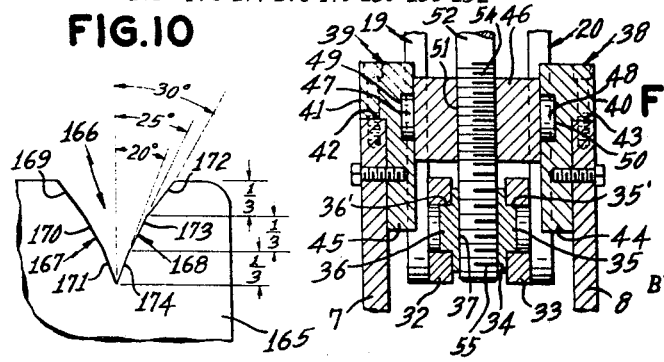
INVENTORS
Walter Gauer
Richard E. Hathaway
BY John B. Koralie
AGENT

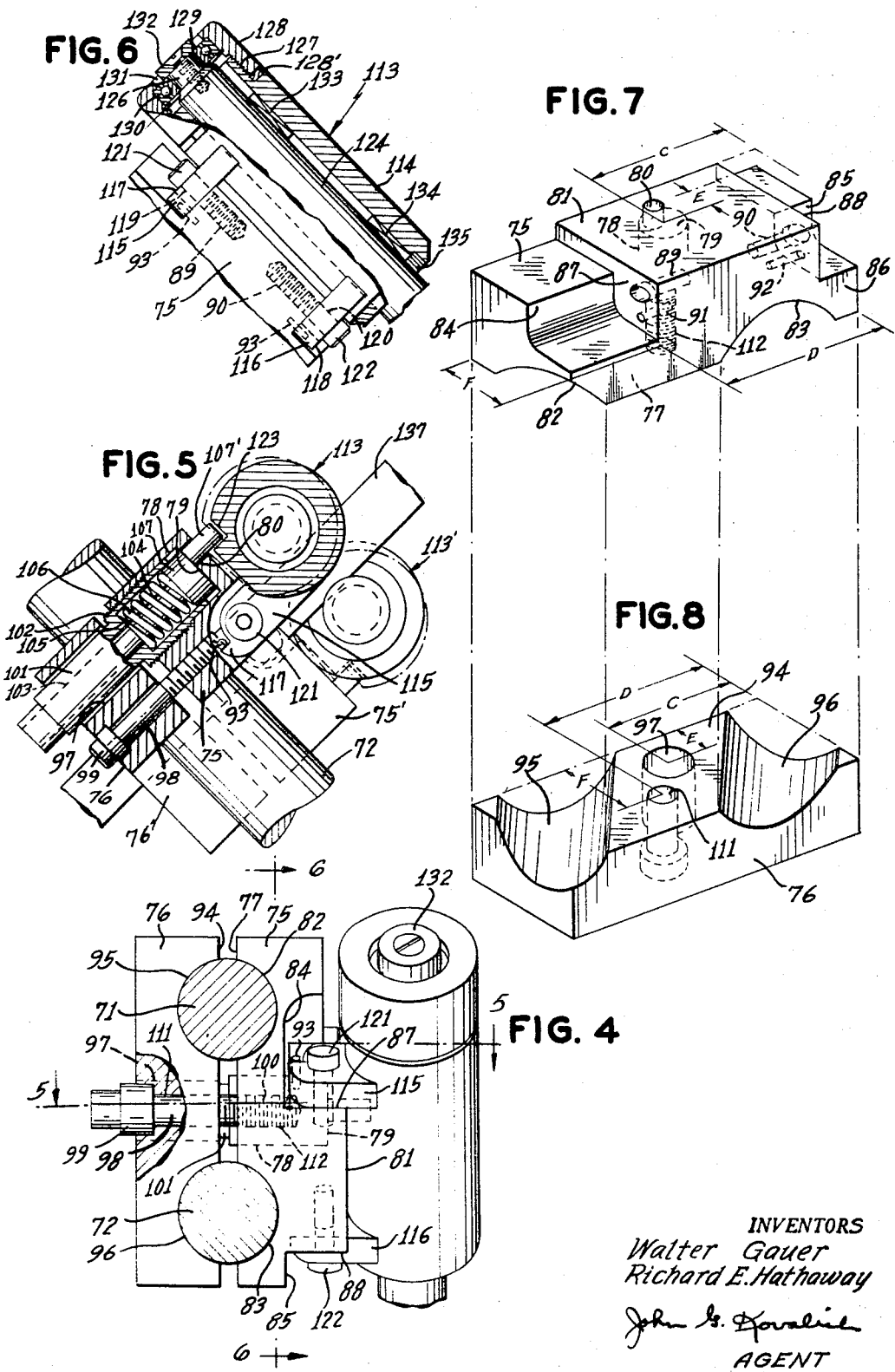

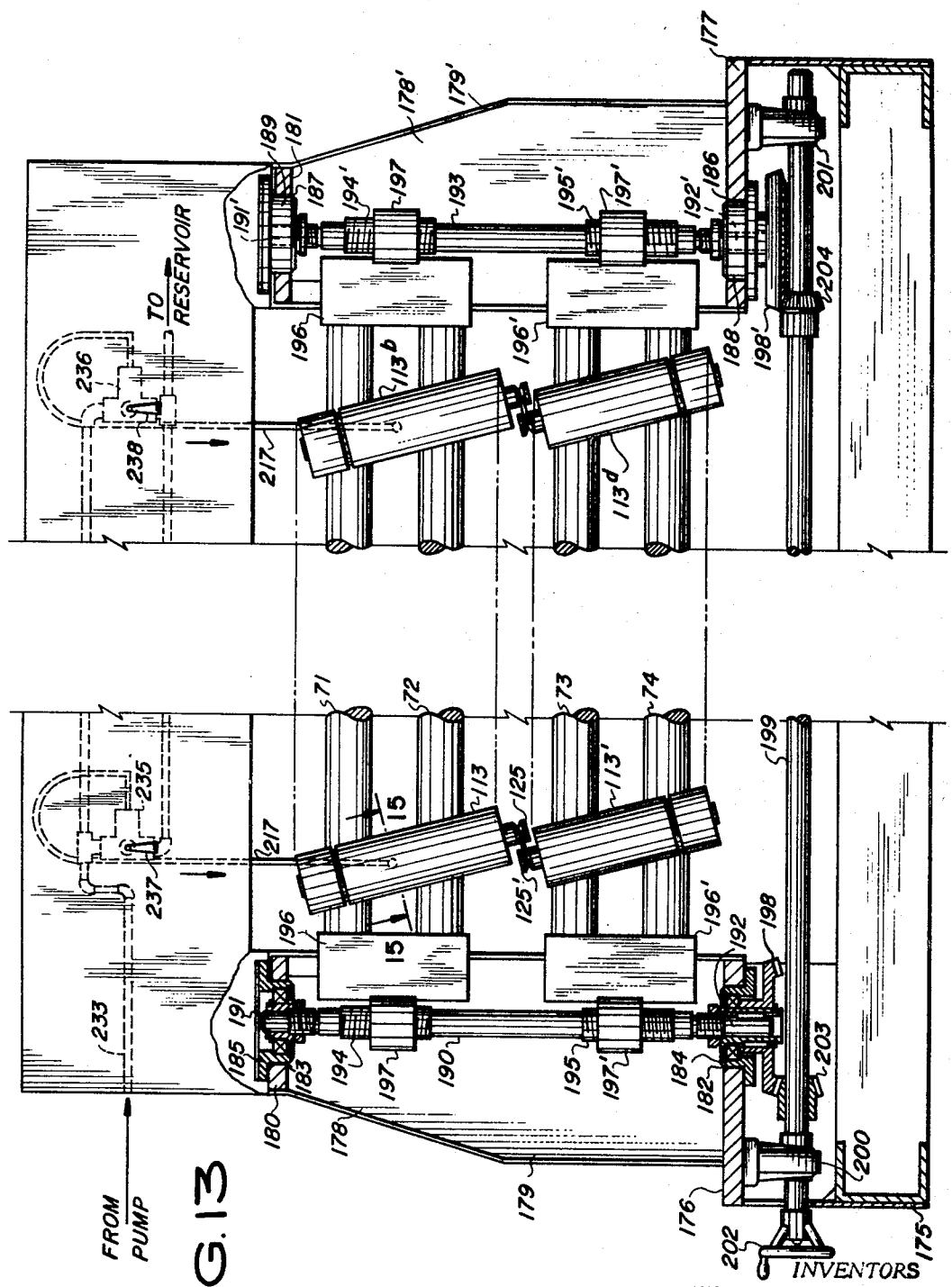

Oct. 28, 1969     W. GAUER ET AL     3,474,653
METAL STRIP EDGING APPARATUS
Filed Aug. 23, 1967     5 Sheets-Sheet 5
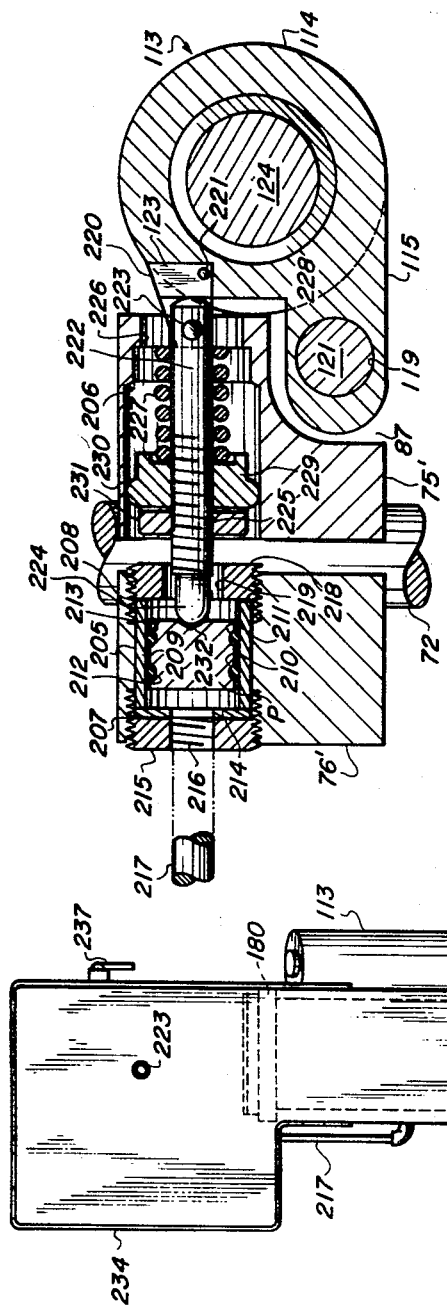
FIG. 15
FIG. 14
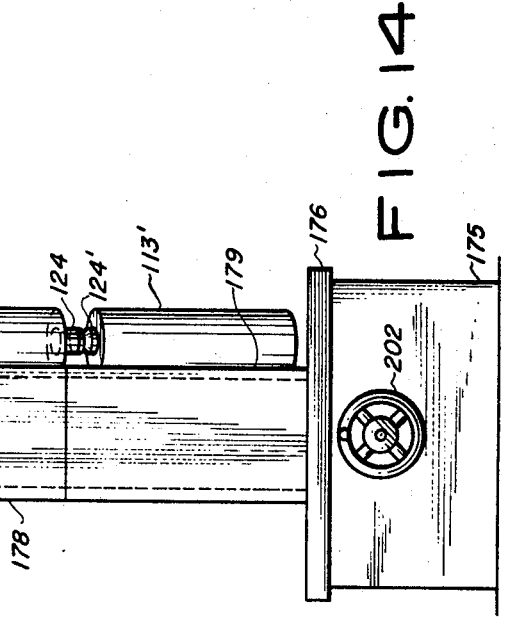
INVENTORS
WALTER GAUER
RICHARD E. HATHAWAY
BY
AGENT

United States Patent Office 3,474,653
Patented Oct. 28, 1969

3,474,653
METAL STRIP EDGING APPARATUS
Walter Gauer, Kenilworth, and Richard E. Hathaway, Brookside, N.J., assignors to Gauer Metal Products, Inc., Kenilworth, N.J., a corporation of New Jersey
Continuation-in-part of application Ser. No. 362,660, Apr. 27, 1964. This application Aug. 23, 1967, Ser. No. 662,630
Int. Cl. B21b
U.S. Cl. 72—199                    3 Claims

ABSTRACT OF THE DISCLOSURE

The present invention deals with a metal strip edging apparatus comprising a pair of elongated horizontally extending carriage means substantially parallel to each other and vertically spaced from each other, first and second substantially cylindrical strip edging members, first and second edging member mount means, the edging members each being rotatably mounted on one of the mount means, the mount means each being secured to one of the carriage means vertically one above the other, means for moving the pair of carriages vertically relative to each other, and means for hydraulically rotatably motivating one of the edging members relative to its mount means in the direction of the other strip edging member.

---

This application is a continuation-in-part of co-pending application Ser. No. 362,660, filed Apr. 27, 1964, now Patent No. 3,343,394, granted Sept. 26, 1967.

The apparatus of the invention comprises cooperating elements especially adapted not only to accommodate a wide range of metal strip dimensions in the edging operation, but to provide for the accurate and controlled edging of strip materials composed of various metals and metal alloys including relatively soft as well as relatively hard metals with controlled edging accuracy.

When metal strip of desired dimensions is sheared or slit from comparatively wider metal sheet stock, there is the attendant formation of burrs or ridges out of the plane of the strip surfaces or out of the plane of the narrow strip edge normal to the longitudinal dimension of the strip. These burrs or ridges are often extremely sharp and present a hazard in the handling of the sheared or slit strip. Apart from the potential hazard the sheared edges lack straight-edged uniformity and are disadvantageous, for example, when edge-to-edge welding or close fit edge abutment is contemplated.

Various types of strip metal apparatus are known but in general they lack the versatility of easily accommodating a wide range of strip dimensions, they lack operability to provide constant edge tolerances with a wide variety of metal compositions, and they are otherwise unable to provide uniform edging of strips having slight variations in width.

It is an object of the invention to provide a strip metal edging apparatus adapted to accommodate a large number of metal strips during the edging operation.

It is another object of the invention to provide a metal strip edging apparatus adapted to accommodate a wide variety of metal compositions for accurate and controlled edging of the work material.

It is a further object of the invention to provide an edging apparatus easily adjustable for operation with strips of different widths and compositions.

It is a still further object of the invention to provide a safety strip edging apparatus for simultaneously safety edging a plurality of strips emerging from a slitting machine.

It is a still further object of the invention to provide an apparatus for safety edging strip material and which incorporates cooperative components to provide for controlled yieldable edging pressures.

Other objects and advantages of the invention will become apparent from the description hereinafter following and the drawings forming a part hereof, in which:

FIGURE 1 illustrates an elevational side view of the apparatus according to the invention,
FIGURE 2 illustrates a top view of FIGURE 1,
FIGURE 3 illustrates an end elevational view along lines 3—3 of FIGURE 1,
FIGURE 4 illustrates a partly elevational and partly cross-sectional view along lines 4—4 of FIGURE 1,
FIGURE 5 illustrates a partly elevational and partly cross-sectional view along lines 5—5 of FIGURE 4,
FIGURE 6 illustrates a partly elevational and partly cross-sectional partial view showing a component part of the invention viewed normal to and along lines 6—6 of FIGURE 4,
FIGURES 7 and 8 illustrate isometric views of mating block components,
FIGURE 9 illustrates a fragmentary cross-sectional view of the linkage along lines 9—9 of FIGURE 1,
FIGURE 10 illustrates an enlarged fragmentary plan view of a deburring component configuration according to the invention,
FIGURE 11 illustrates an enlarged fragmentary elevational view of cooperating components adapted to accommodate narrow strips in a deburring operation,
FIGURE 11A illustrates an enlarged fragmentary elevational view of cooperating components adapted to accommodate strips of greater width in a deburring operation,
FIGURE 12 illustrates a diagrammatic view showing a plurality of deburring units in laterally spaced relationship to accommodate a plurality of closely spaced parallel strips,
FIGURE 13 illustrates a partly elevational and partly cross-sectional side view of a modified hydraulically operated apparatus according to the invention,
FIGURE 14 is an elevational end view of FIGURE 13, and
FIGURE 15 is a cross-sectional view of a hydraulically operated component of the invention along lines 15—15 of FIGURE 13.

Referring to FIGURES 1, 2 and 3 the invention comprises a strip edging apparatus having a first pair of laterally spaced aligned supports 1 and 2 and a substantially similar second pair of laterally spaced aligned supports 3 and 4. The first and second support pairs are also laterally spaced from each other. The supports 1 and 2 have bases 5 and 6, respectively, either integrally interconnected by bridge B, illustrated in FIGURE 3, or are separately securable to a bench, or the like, and support arms 7 and 8, respectively, extending upwardly from their respective bases. Each support arm 7 and 8 is provided with a bore 9 and 10 at a location above the base with the bores being coaxially aligned. The arms 7 and 8 are interconnected by a pivot shaft 11, e.g. a bolt shaft, passing through the bores. The similar supports 3 and 4 are correspondingly provided with bases 12 and 13, arms 14 and 15, bores 16 and 17 and pivot shaft 18, which correspond in structure, configuration and relative position to like components of the first pair of supports. Lever means in the form of a pair of substantially T-shaped laterally spaced lever arms 19 and 20 each being identical and having a leg 21 with cross-bar 22 are rotatably mounted on the pivot shaft 11 with the lever arm 19 being adjacent support arm 7 and lever arm 20 being adjacent support arm 8. The pair of T-cross-bars each have opposite ends 23 and 24 with bores 25 and 26 respectively, formed therethrough. The cross-bars of the pair of laterally spaced levers are rotatably interconnected by shafts 27 and 28, respectively, passing through the axially aligned bores, while the cross-bars are likewise rotatably interconnected intermediate the ends 23 and 24 on the aforementioned shaft 11. The legs 21 of the levers 19 and 20 are each provided with a pair of laterally spaced bores 29 and 30 with a shaft 31 passing therethrough and interconnecting the legs through the bores 29. The function of bore 30 is hereinafter described. A pair of laterally spaced elongated clutch arms 32 and 33 are mounted on shaft 11 through one end portion of each of the clutch arms and positioned adjacent the inner sides of the lever arms 19 and 20, respectively. At a location intermediate the ends thereof, the clutch arms are mounted on shaft 31, thereby affixing the lever arms against a relative movement between the lever arms and the clutch arms. Mounted between the other ends of the clutch arms 32 and 33, as particularly illustrated by FIGURE 9 in conjunction with FIGURES 1, 2 and 3, is a spacer means 34 having oppositely extending lugs 35 and 36 engaging complementary recesses 45' and 36' in the free end portions of cltuch arms 32 and 33. The spacer is provided with an internally threaded bore 37 therethrough transversally of the spacer axis. A pair of laterally spaced susbtantially L-shaped adapters 38 and 39 are each mounted on one of the support arms 7 and 8 with head portions 44 and 45 extending toward the bases 5 and 6 and secured along the inner surfaces of the support arms. A second spacer means 46 is provided with oppositely extending lugs 47 and 48 engaging recesses 49 and 50 in the inner surfaces of adapters 38 and 39. The second spacer is provided with an internally threaded bore 51 transversally therethrough. The threads of bore 37 of spacer 34 are of greater pitch than the threads of bore 51. A screw member 52 is provided with a hand turn wheel 53 at one end thereof. The other end portion of the screw member 52 is provided with dual screw sections 54 and 55, one preceding the other and such that the first section 55 is of greater pitch than the second section 54. The screw member 52 is engaged with both spacers 34 and 46 so that the first screw section 55 engages the threaded bore 37 of spacer 34 and the second section 54 engages the smaller pitch threaded bore 51 of spacer 46. Consequently, turning of hand wheel 53 causes the clutch arms 32 and 33 and the affixed lever legs 21 to move a greater distance along screw section 55 than the axial movement of the screw section 54 in spacer 46. Otherwise stated, the rotary movement of hand wheel 53 along a substantially small arc provides for a controlled operative angular movement of the lever cross-bars 22 on the pivot shaft 11 through the activation of the clutch arms 32 and 33 affixed to the levers 19 and 20.

Referring to FIGURES 1 and 2, a second pair of laterally spaced elongated levers 56 and 57 having end portions 58 and 59 are rotatably mounted intermediate their ends 58 and 59 on the pivot shaft 18. The end portions 58 and 59 of the pair of levers are provided with bores 60 and 61 and rotatably interconnected by means of shafts 62 and 63 which are, respectively, mounted in the coaxially aligned bores 60 and 61. Blocks 64 and 65 are mounted on shafts 27 and 28 between the end portions 23 and 24 of the lever cross-bar 22, with the shafts 27 and 28 passing through block bores 66 through each of the blocks. Blocks 67 and 68 are mounted on shafts 62 and 63 between end portions 58 and 59 of levers 56 and 57. The blocks 64 and 67 are each provided with a pair of spaced bores 69 and 70 normally of bores 25 and 60 with the shafts 27 and 62 passing therebetween. Blocks 65 and 68 are identically provided with bores corresponding to bores 69 and 67 of blocks 64 and 67. A first parallel pair of spaced bridge rails 71 and 72 have their opposite ends threadedly mounted in the bores 69 and 70 and are secured to blocks 64 and 67 by identical nuts 72', thereby interconnecting the blocks 64 and 67. A second parallel pair of spaced bridge rails 73 and 74 are identically mounted on and interconnect the blocks 65 and 68, the second pair of rails being variably spaceable from the first pair of rails along a small arch generated by the axes of shafts 27 and 28 about the pivot shaft 11.

In operation, rotary manipulation of the hand wheel 53 causes screw section 54 of screw 52 to move a relatively small distance axially of bore 51 (FIGURE 9) with a relatively greater movement of spacer 34 axially of screw section 55. The movement of spacer 34, being secured to the pair of clutch arms 32 and 33, which are connected to the lever arms 19 and 20 shaft 31 (FIGURE 1) causes the shafts 27 and 28 to move along a small arc generated by the said shafts about the axis of pivot shaft 11. With the blocks 64 and 67 being mounted on shafts 27 and 62, the activation of the lever arms 19 and 20 causes the pairs of parallel rails to move in opposite directions relative to each other both longitudinally thereof and along a small arc generated by the shafts 27 and 28 about the pivot shaft 11.

Referring to FIGURES 4, 5, 7 and 8, a composite split mounting block comprising substantially rectangular block sections 75 and 76 is adapted for mounting on the first and second pairs of rails. The block section 75 is provided with a substantially flat inlet face 77 having a centrally located inlet counterbore 78 formed into the flat face 77 and terminating in an internal abutment face 79 internally threaded as at 78' of FIGURE 5. An outlet bore 80 of smaller diameter than the counterbore is formed eccentrically of the counterbore axis through the abutment face 79 and terminates in the plane of and through the outlet face 81. A pair of laterally spaced substantially semi-cylindrical parallel channels 82 and 83, with the counterbore 78 therebetween, are formed in the face 77 and they are directed across said face 77 at acute angles relative to the sides of the rectangular block section. A pair of recesses 84 and 85 are cut-away from opposite sides of the block along portions of a common edge 86, each recess terminating in flat seats 87 and 88 spaced from each other along the said edge 86. Blind mounting bores 89 and 90 in axial alignment with each other are formed one each in the seats 87 and 88 in a direction toward each other. Blind pin bores 91 and 92 are similarly formed in said seats 87 and 88 in spaced relationship relative to the bores 89 and 90. Abutment pins 93 (FIGURES 4 and 5) are inserted into pin bores 91 and 92 and extend outwardly of the seats 87 and 88. Referring to FIGURE 8, the block section 76 is provided with a flat face 94 and with substantially semi-cylindrical channels 95 and 96 mating the face 77 and channels 82 and 83 when positioned facing each other. A bore 97 is formed through block 76 coaxially of counterbore 78. For securing the blocks there is provided an externally threaded screw 98 with a head 99 at one end and a threaded shank 100 which passes through bore III and engages bore 112. The letter designations C, D, E and F of FIGURES 7 and 8 are illustratory in showing the relative dimensions and the mating relationship of the two block sections. The blocks 75 and 76 are positioned on rails 71 and 72, as illustrated by FIGURES 2 and 4, with the rails engaged between the block sections and positioned in the angularly directed channels 82–95 and 83–96 so that the blocks are longitudinally angularly disposed relative to the parallel rails. Having so positioned the block sections on the rails, the blocks are mounted and secured as illustrated in FIGURES 2, 4 and 5. A sleeve member 101 having an externally threaded collar 102 intermediate the ends thereof and a bore 103 therethrough is threadedly engageable with the counterbore 78. The sleeve 101 has at one end portion a piston cavity 104 of greater internal diameter than that of the internal bore 103. The piston cavity terminates in an abutment face 105 internally of the sleeve. A helical compression spring 106 is mountable in the piston cavity 104 with one end thereof in abutment with the abutment face 105. A cylindrical piston member 107 is inserted in the piston cavity substantially at the end thereof with one end face in abutment with the other end of the compression spring, the piston member being dimensioned for piston action with the internal surface walls of the piston cavity. A pin member 107' extends outwardly of the other end face of the piston member eccentrically of the piston axis.

Having provided the assembly components comprising the sleeve, screw member, spring and piston, the sleeve with the spring and piston mounted in the piston cavity, threadedly engaged with the collar 102 threaded with counterbore internal threads 78' and with the eccentric pin 107' extending into and outwardly of the eccentric bore 80 of block section 75. The blocks 75 and 76 are brought into mating position and rails 71 and 72 with an unthreaded portion of the sleeve 101 rearwardly of the collar 102 mounted internally of the bore 97 of block 76. With the blocks so positioned, the screw 98 is inserted through a bore 111 through block section 76, with the bore being spaced from the bore 97, and into threaded engagement with an internally threaded blind bore 112 in block section 75. The bore 112 being spaced from the bore 97, and into threaded engagement with an internally threaded blind bore 112 in block section 75. The bore 112 being spaced from the counterbore 78.

Referring to FIGURES 4, 5 and 6, an elongated headstock member 113 is mounted on the block section 75. The headstock member comprises an outer cylindrical tubular sleeve 114 having a pair of parallel lugs 115 and 116 extending tangentially outwardly of the sleeve 114 normal to the sleeve axis and spaced longitudinally thereof. Each lug is provided with a terminal abutment means 117 and 118, respectively, and with a bore 119 and 120, respectively, formed therethrough and in coaxial alignment with each other. The headstock 113 is mounted on the block section 75 with the inner faces of the spaced lugs in engagement with the seats 87 and 88, with the abutment means 117 and 118 facing and abutable with abutment pins 93. The headstock is rotatably secured to the block section 75 by means of partly threaded bolts 121 and 122 with bolt 121 passing through bore 119 threadedly into bore 89 and with bolt 122 passing through bore 120 threadedly into bore 90, respectively. The outer surface of sleeve 114 is provided with a longitudinal recess eccentrically of the sleeve axis and having an abutment seat 123 normal to and eccentric of the sleeve axis, the abutment seat 123 being laterally spaced from the lugs 115 and 116 peripherally of the sleeve 114 and engageable with the end of pin 107', as hereinafter more particularly described. An elongated shaft 124 is rotatably mounted through the sleeve 114 with its deburring or edging head 125 (FIGURE 11) extending outwardly of one end of the sleeve and its opposite mounting end 126 extending outwardly of the other end of the sleeve. The end of the sleeve 114 adjacent the mounting end 126 is externally threaded as at 127 and an internally threaded retainer cap 128 is thereby threadedly securable onto the said end of the sleeve. The mounting end 126 is provided with a reduced annular bearing seat or neck 129 with an annular ball bearing means 130 mounted thereon and positioned between the seat and the inner wall of the cap 128. The ball bearing means 130 is secured on said neck against movement axially of the shaft 124 by said neck and a top portion of the cap 128. An aperture 131 is formed through the cap top and a retainer ring 132 of greater diameter than the neck is affixed to the end of the end of neck 129 thereby securing the shaft 124 relative to the cap 128. Consequently, removal of the cap from the sleeve 114 is accompanied by the simultaneous removal of the shaft from the sleeve. Needle bearing 133 and 134 are positioned in the sleeve 114 intermediate the shaft and the inner surfaces of the sleeve. A centering terminal ball bearing means 135 is mounted in the sleeve 114 adjacent its other or free end portion and intermediate the shaft 124 and sleeve 114. It is apparent that the shaft 124, mounted as described, is freely rotatable relative to the sleeve 114 and cap 128.

In view of the angular mounting of the bracket sections 75 and 76 relative to rails 71 and 72, it is apparent that the headstock 113 is likewise so angularly positioned and parallel with the block sections 75 and 76.

A second composite block comprising block sections 75' and 76' is mounted on the second pair of rails 73 and 74. The second composite block comprising block sections 75' and 76' is identical with the composite block comprising block sections 75 and 76 and is likewise identically mounted on the second pair of rails 73 and 74.

A second head stock 113' of identical structure compared to headstock 113 as illustrated by primed numerals is similarly mounted on block section 76' with the exception that the headstock 113' is directed in its mounting on block section 75' in reverse position relative to headstock 113 so that the deburring heads 125 and 125' are positioned adjacent each other as illustrated in FIGURES 1 and 11. Regarding FIGURES 1 and 2, a plurality of identical laterally spaced parallel headstocks 113, 113a, 113b, etc., are mounted on rails 71 and 72 and a plurality of identical laterally spaced headstocks 113', 113c, 113d, etc., are mounted on the rails 73 and 74.

Referring to FIGURES 1 and 11, the cylindrical deburring heads 125 and 125' of shafts 124 and 124' are each provided with a coaxial V-shaped groove 136 and 136', respectively, adjacent the free ends of the said shafts. Preferably, but not necessarily, the shafts 124 and 124' are mounted in their respective sleeves 114 and 114' at an angle of 45° relative to rails 71 and 73.

In operation, the several composite blocks mounted on the spaced pairs of rails as described supra are slidably manipulated along their respective rails so that a plurality of laterally spaced strips 137, 138, 139, 140, 141, 142, 143, 144 of specified width are freely insertable and loosely retained in the V-shaped grooves of the cooperating adjacent deburring heads 125 and 125', etc. The headstocks and their respective shafts 124, 124', etc. are then fixed in such position by tightening securing bolts 98 which secure the composite blocks along the rails.

Having loosely and freely retained the several parallel strips between their respective cooperating deburring heads and in the V-shaped grooves, the hand turn wheel 53 is operated and activates levers 22 which move the space pairs of rails in opposite directions, e.g. toward each other, with the deburring heads moving likewise to more firmly secure the strips in the grooves of their respective pairs of deburring heads. Having firmly secured the strips, each of the headstocks are rotatably and yieldably pressurized against the edges of the strips under yieldable compression empirically selected for the metal composition of the strips. This is accomplished by threadedly advancing the sleeves 101 into the piston cavities 104 thereby exerting compression forces afforded by compression spring 106 against piston 107 whereby piston pins 107' engage the eccentric seats 123 tending to rotate headstocks 113 and 113' on their axes and toward each other. In lieu of the compression springs 106 other compression means such as rubber resilient means or gas pressure means may be substituted so long as the compression means are capable of controlled yieldability. It will be recognized that the advancement of sleeves 101 will control the yieldability of compression springs 106. In other words, the deburring heads 125 and 125' and their respective V-shaped grooves, with the strips positioned therein, are under resultant forces of compression afforded by the strips and the advancement of sleeve 101 against the compression means. The term "resultant forces of compression" refers to the resultant forces generated by the strips in opposition to the forces employed in comprising the springs 106.

Having so set each of the headstocks, a parallel set of strips having strips which are of the same width or widths which may vary within a prescribed tolerance, are effectively deburred by passing, e.g. by pulling the strips between their cooperating pairs of deburring heads which coin or press the burrs or ridges back into the strip edge. Also, in addition to the initial established controlled yieldability of the spring 106 as described above it is apparent that the degree of turning of hand wheel 53 in activating levers 22 permit a further optimum pressurization against the strips in consideration of the metal composition of the strips and their degree of hardness or softness. When a set of parallel strips are deburred, the hand wheel 53 is turned in an opposite direction moving the deburring heads away from each other sufficiently to permit the engagement of a new set of parallel strips. In this case, since the sleeves 101 have been previously set as described above, the pins 107' are in contact with seats 123 with the headstocks in their maximum degree of rotation toward each other as illustrated by FIGURE 5. Therefore, operation of the hand wheel 53, with the strip 137 positioned between the headstocks, causes the headstocks and their respective deburring heads to move toward each other against the strip whereby such movement causes the headstocks to turn on their axes in a counter direction with the eccentric seats 123 activating pins 107' in pressurization against the strips. It is evident that in such case, with the position of the headstocks on their respective rails once established, the simple operation of hand wheel 53 is effective in providing and controlling optimum compression against the strips.

There are mechanical limits to the widths of strips which can be effectively deburred with the deburring heads 125 and 125' positioned at the 45° angle illustrated in FIGURE 11 and activated by means of the dual screw sections 54 and 55 of screw member 52. To overcome such limitation, an auxiliary set of composite split mounting blocks are provided which are otherwise identical with block sections 75 and 76 except that the channels 82–95 and 83–96 of block sections 75 and 76 are substituted by similar channels angularly directed to provide, when mounted on the rails, angles less than about 45° with the rails, e.g. 15° angles as illustrated in FIGURE 11A. In such case wider strips 137' may be easily and effectively accommodated within prescribed strip width tolerances, provided, however, that in such case the lever leg 21 (FIGURE 1) is adjusted by removing the shaft 31 (by means of a punch member or the like inserted through bores 30' in support arms 7 and 8) from engagement with bores 29, moving the leg 21 until the leg bores 30 are in alignment with bores 30' and replacing the shaft 31 into engagement with leg bores 30. With the lever now in its alternate position the dual thread screw 52 will effectively operate with the auxiliary split mounting blocks for the edging of the wider strips 137'. Alternatively, a long bolt means (not shown) having a diameter corresponding with shaft 31 may be inserted through the leg bores 30 and also through the support arm bores 30' provided that the bores 30' are of larger diameter than the bolt diameter thereby affording a play between the bolt and bores 30' sufficient to permit a relative movement of the bolt in the bores 30'. This is possible since the action of the dual screw sections of screw 52 need provide only a small lateral movement of the deburring heads 125 and 125' once the heads are positioned relative to each other as described above.

It will be seen in FIGURE 11 that the grooves 136 and 136' are aligned with each other with the apices of the V-shaped groove being substantially in a common plane passing through the metal strip 137 positioned therebetween. While some tolerance in strip widths is permissible, greater strip widths would require a small increase in lateral spacing between the grooves 136 and 136'. When the lateral spacing of the grooves relative to each other is so increased, the apices of the grooves are no longer in the aforesaid common plane. In order to rectify this condition to maintain the alignment of the apices in a common plane, the increase in the lateral spacing between the grooves 136 and 136' is accompanied by an attendant retraction of the deburring heads 125 and 125' axially of the sleeves 114 and 114'. In order to maintain the proper degree of retraction during the edging operation, spacers 128', e.g. spacer rings, are inserted adjacent the threaded portion 127 and between head 128 and the sleeve 114 as illustrated in FIGURE 6. The width of the spacer rings are determined in consideration of the width of the strip workpiece employed.

Referring to FIGURES 1 and 2, it will be seen that the strips 137, 138, 139, etc., are rather widely spaced apart. The substantially wide spacing between the strips is necessitated in consideration of the bulk and diametrical dimensions of the headstocks 113, 113a, 113b, etc., which prevent the deburring heads 125 and 125' from adjacent spacing close enough to accommodate parallel workpiece strips closely adjacent each other, for example, as emerging from an upstream sheet slitting apparatus. In order to accommodate such closely adjacent workpiece strips, a plurality of metal strip edging apparatus units X, Y and Z are provided in series with each other as illustrated by FIGURE 12, whereby closely adjacent parallel strips are accommodated. In such case alternate strips are handled by one of the units X, Y and Z. For example, while the unit X operates in connection with strips 137 through 144, the next downstream unit Y operates on alternate strips 145 through 152 and the following downstream unit Z operates on strips 153 through 160. In this manner closely adjacent parallel strips are accommodated.

In accordance wtih FIGURE 10, the apparatus of the invention incorporates a preferred form of V-shaped deburring head 165 in order to provide for the deburring of strips of different thicknesses by the same apparatus. The deburring head 165 comprises an annular V-shaped deburring groove 166 having converging opposite walls 167 and 168 composed, of respectively, bevelled sections 169, 170 and 171 and 172, 173 and 174 constituting a series of flat faces converging toward each other in the direction of the groove axis. For example, the outer V-shaped sections 169 and 172 may be bevelled at an angle of 30° with a plane normal to the groove axis, the intermediate sections 170 and 173 may be so bevelled at 25° angles, and the terminal sections 171 and 174 may be so bevelled at 20° angles. Preferably but not necessarily, the opposite coopearting sections may each extend a ⅓ distance along the converging walls.

It is apparent that the edges of the wider strips being deburred will contact sections 169 and 172, the edges of the narrower strips will contact the intermediate sections 170 and 173, and the edges of the narrowest strips will contact the terminal sections 171 and 174.

FIGURES 13, 14 and 15 illustrate a modification of the invention in that the pair of carriage means is movable vertically of each other rather than longitudinally of each other and the cylindrical headstock members, e.g. headstock members 113 and 113b, mounted on one of the carriage means, e.g. carriage means comprising rails 71 and 72, are hydraulically motivated.

In FIGURES 13, 14 and 15, the numerical references identical with those of FIGURES 1 through 12 denote identical structures.

The apparatus of the modfication comprises an elongated base 175 having seated thereon a lower table 176 on a forward end portion thereof and another lower table 177 on a rearward end portion thereof. A pair of laterally spaced support arms 178 and 179 extend upwardly of table 176, as shown in FIGURE 14, and a pair of identical support arms 178' and 179' extend upwardly of table 177. Upper table 180 is mounted on top of and bridges the arms 178 and 179 and upper table 181 is mounted on top of and bridges arms 178' and 179'. Lower table 176 and upper table 180 are provided with vertically aligned apertures 182 and 183, respectively, in which are mounted bearing means 184 and 185, respectively. Lower table 177 and upper table 181 are also identically provided with vertically aligned apertures 186 and 187, respectively, in which are mounted bearing means 188 and 189, respectively. A vertical rod 190 has its upper end portion 191 journalled in bearing means 185 and its lower end portion 192 journalled in bearing means 184 and with the end portion 192 extending below lower table 176. Another identical vertical rod 193 has its upper end portion 191′ journalled in bearing means 189 and its lower end portion 192′ journalled in bearing means 188 and also extending below lower table 177. Rod 190 is provided with a threaded portion 194 near its upper end portion and a threaded portion 195 near its lower end portion. The threads of one of the portions 194 and 195 being threaded in a clockwise direction with the other being threaded in a counter clockwise direction. Rod 193 is also provided with thread portions 194′ and 195′ identical with threaded portions 194 and 195 of rod 190. A first parallel pair of spaced carriage rails 71 and 72 and a second parallel pair of spaced carriage rails 73 and 74 positioned in vertical alignment below the first carriage rails 71 and 72 are each provided at their opposite end portions with identical blocks 196 and 196′, respectively. The blocks 196 and 196′, respectively. The blocks 196 interconnect rails 71 and 72 and blocks 196′ interconnect rails 73 and 74. Internally threaded sleeves 197 are fixed to each of the blocks 196 and extend outwardly of the blocks 196 in threaded engagement with the upper threaded portions 194 and 194′ of rods 190 and 193, and internally threaded sleeves 197′ are fixed to each of the blocks 196′ and extend outwardly of the blocks in threaded engagement with the lower threaded portions 195 and 195′ of rods 190 and 193. The lower portions 192 and 192′ of rods 190 and 193 which extended below tables 176 and 177 are each provided with a bevel gear 198 and 198′, respectively. A long drive shaft 199 is mounted in journal means 200 and 201 depending from the lower surfaces of tables 176 and 177. A hand wheel 202 is mounted on one end of drive shaft 199. Bevel gears 203 and 204 are mounted on shaft 199 in spaced relationship with each other along the shaft with bevel gear 203 engaging bevel gear 198 and bevel gear 204 engaging bevel gear 198′. Thus, when hand wheel 202 is turned, the first and second pair of carriage rails are moved in a vertical direction toward or away from each other depending on the direction of turning of the handwheel 202 and due to the clockwise and counterclockwise threading.

A plurality of composite split mounting blocks comprising substantially rectangular block selections 75 and 76 and associated components as particularly described in FIGURES 4, 5, 7 and 8 are mounted on the second pair of rails 73 and 74. The composite blocks each carry headstock members 113′ and 113d and their associated components as described in FIGURES 1 and 6 and comprising a deburring head 125′ positioned as illustrated in FIGURES 1 and 13 showing the deburring head 125′ angularly directed in the direction of the first pair of rails 71 and 72.

FIGURE 15 illustrates a view taken along lines 15—15 of FIGURE 13. The composite block comprises block sections 75′ and 76′ which correspond with blocks 75 and 76 illustrated in FIGURES 4, 5, 7 and 8 relative to shape and mounting means for mounting on the first pair of rails 71 and 72. Block sections 75′ and 76′ are modified relative to block sections 75 and 76 shown in FIGURES 7 and 8 only in that the counterbore 78 of FIGURE 7 and bore 97 of FIGURE 8 have been substituted by bores 205 and counterbore 206 adapted to contain hydraulic operating means for rotating the headstocks 113 and 113b in the same manner that the headstocks are rotated by spring tension as illustrated by FIGURE 5. The bore 205 is internally threaded as at 207 along its inlet portion and as at 208 along its outlet portion. A sleeve 209 is inserted in bore 205 intermediate the threaded portions 207 and 208. A piston member P is inserted into sleeve 209 and is adapted to slide in the sleeve 209. The piston is circumferentially grooved as at 210 and 211 and resilient ring seals, e.g. O-ring seals 212 and 213, are mounted in the grooves to prevent leakage of the pressurized hydraulic fluid subsequently applied.

A centrally apertured disc 214 is mounted in the bore 205 in abutment with an end of the sleeve 209. An externally threaded nut 215 is engaged with the bore inlet threads 207. The nut is also provided with a threaded central aperture 216 adapted to engage an end portion of a hydraulic conduit 217.

Another externally threaded nut 218 is engaged with the threads 208 at the outlet portion of bore 205. Nut 218 is also provided with a central aperture 219.

Sleeve 114 of headstock 113 is provided with an abutment seat 123 normal to and eccentric of the axis of sleeve 114 identically as illustrated in FIGURE 5. A triangular plate 220 is mounted on seat 123 by means of mounting pin 221. A shaft 222 is pivotally connected to an end portion of plate 220 by a pivot pin 223. The free end 224 is a rounded end and adjacent the rounded end portion the shaft is provided with an externally threaded portion 225. The shaft passes from the plate 220 into and through counterbore 206 through a horizontal slot 226. Having passed the shaft into counterbore 206, a compression spring 227 is mounted on the shaft inside counterbore 206 and with one end in abutment with the internal surface 228 of the counterbore defining the slot 226. The slot 226 is narrower than the diameter of the spring 227. A spring-seating ring 229 having a rounded external surface 230 is mounted on shaft 222 in abutment with the other end of spring 227. The rounded surface 230 of the spring seating ring is in contact with the inner walls of counterbore 206. A retaining nut 231 is threaded onto the threads 225 of shaft 222 sufficiently to place spring 227 under compression tension.

When the block sections 75′ and 76′ are assembled onto rails 71 and 72 as illustrated by FIGURE 4, the free end or rounded end 224 of shaft 222 passes into bore 205 of block section 76′ through aperture 219 of nut 218. Aperture 219 is of larger diameter than the free end portion of rod 222 and the shaft end is freely passable therethrough. The rounded end portion 224 engages a spherical depression 232 in piston P. Thus, when pressurized hydraulic fluid enters bore 205 through conduit 217, the piston P urges shaft 222 against plate 220 which acts against eccentric seat 123 to rotate the headstock member 113. However, since shaft 222 is pivoted on pivot pin 223, the end of the shaft connected to plate 220 rides horizontally in slot 226 with spring-seating ring 229 tilting slightly and moving angularly along the rounded surface 230 against the inner wall of counterbore 206, the movement being permissible by means of rounded end 224 freely movable in spherical depression 232 and the large diameter of aperture 219 in nut 218.

In applying the hydraulic fluid, the fluid passes, in accordance with FIGURE 13, from a hydraulic pump (not shown) into conduit 233 entering cabinet 234 mounted on upper tables 180 and 181, through valves 235 and 236, regulated by valve handles 237 and 238, into conduits 217 feeding the bore 205 as illustrated by FIGURE 15.

Various modifications of the invention are contemplated within the scope of the appended claims.

What is claimed is:

1. Apparatus for edging metal strip material comprising first and second substantially cylindrical strip edging members, first and second tubular edging member mount means, the edging members each being rotatably mounted in one of the mount means, a pair of parallel elongated horizontally disposed carriage means, the carriage means being co-extensive and vertically spaced relative to each other, first and second block means each mounted on one of the pair of carriage means and positioned one above the other, channel means in the block means, the carriage means being positioned in the channel means, the mount means each being secured to one of the block means and positioned one above the other, at least one of the mount means being rotatably secured to one of the block means, means for moving the pair of carriage means vertically relative to each other, first and second edging heads each on an end portion of an edging member, the edging heads being positioned substantially adjacent each other, each of the edging heads having a circumferential V-shaped groove therein for deburring edges of the metal strip material when positioned therebetween, hydraulic means connected to the block means secured to one of the carriage means, a hydraulic piston means contained in the said block means which is secured to the said one of the carriage means, linkage means between the piston means and the said one of the mount means which is rotatably secured to the block means for rotating the mount means relative to the block means toward the mount means on the other carriage means.

2. Apparatus for edging metal strip material according to claim 1, wherein the means for moving the pair of carriages vertically relative to each other comprises a rider block mounted on the opposite ends of each of the carriage means, the rider blocks each being in vertical spaced alignment relative to each other, a pair of vertical threaded rods each positioned at opposite ends of the vertically spaced pair of carriage means and threadedly engaging the rider blocks, upper and lower portions of each rod being threaded with one portion threaded in a clockwise direction and the other in a counterclockwise direction, the rider blocks of one carriage means engaging the upper threaded portions of the rods and the rider blocks of the other carriage means engaging the lower threaded portions of the rods, gear means on the lower end portions of each rod, a drive shaft carrying a pair of gear means spaced from each other longitudinally of the drive shaft, each of said drive shaft gear means engaging the gear means of one of the rods, whereby the rods are simultaneously rotatable to move each carriage means vertically relative to the other on activation of the drive shaft.

3. Apparatus for edging metal strip material according to claim 1, wherein the block means mounted on one of the carriages comprises a pair of block sections secured to each other with the said one carriage positioned therebetween, the said mount means being rotatably mounted on one of the block sections, a bore formed through one of the block sections and a counterbore in the other block section in axial alignment with the bore, piston means mounted in said bore, hydraulic input means communicating with said bore, a shaft passing co-axially through said counterbore, compression spring means mounted on the shaft internally of the counterbore, one end of the shaft being linked by linkage means to said mount means eccentrically thereof, the other end of the shaft extending into the bore in contact with said piston means, and the said linkage means comprising pivot means between the end of the shaft and the mount means.

References Cited

UNITED STATES PATENTS

| | | | |
|---|---|---|---|
| 1,109,521 | 9/1914 | Fraser | 72—220 |
| 2,063,798 | 12/1936 | Firth | 72—203 |
| 2,326,715 | 8/1943 | Wilson et al. | 72—365 |
| 2,353,290 | 7/1944 | Bennewitz | 72—242 |
| 3,206,965 | 9/1965 | Grauer | 72—206 |

CHARLES W. LANHAM, Primary Examiner

L. A. LARSON, Assistant Examiner

U.S. Cl. X.R.

72—211